Oct. 7, 1952      K. G. KING      2,613,254

ELECTRIC RELAY

Filed May 5, 1950

INVENTOR.
Kenneth Gordon King.
BY
HIS ATTORNEY

Patented Oct. 7, 1952

2,613,254

UNITED STATES PATENT OFFICE 2,613,254

ELECTRIC RELAY

Kenneth Gordon King, London, England, assignor to Westinghouse Brake and Signal Company Limited, London, England Application May 5, 1950, Serial No. 160,127
In Great Britain May 11, 1949

3 Claims. (Cl. 175—335)

This invention relates to alternating electric current relays of the tractive armature type and has for its object to provide an improved relay of this character which shall be of simple and cheap construction, efficient and reliable in operation and highly immune to uni-directional current.

According to the invention the relay comprises a magnetisable core having a pair of pole members co-operating with a relatively movable armature and cross-connected by two core members provided with an energising winding or windings arranged to cause equal and opposite magneto-motive forces in the pole members, the rectifiers being so inductively or conductively associated with the energising winding or windings as to oppose or to prevent the production of magnetic flux in one core member during one half cycle only of the alternating current supplied to the relay, thereby causing flux to traverse the other core member and the pole members and armature.

When the relay is supplied with energising current, a succession of uni-directional pulses of magneto-motive force will evidently be caused in the pole members and the armature, creating a flux in these elements which is maintained by the action of the rectifier circuits and exerts a tractive effort on the armature.

Figure 1:
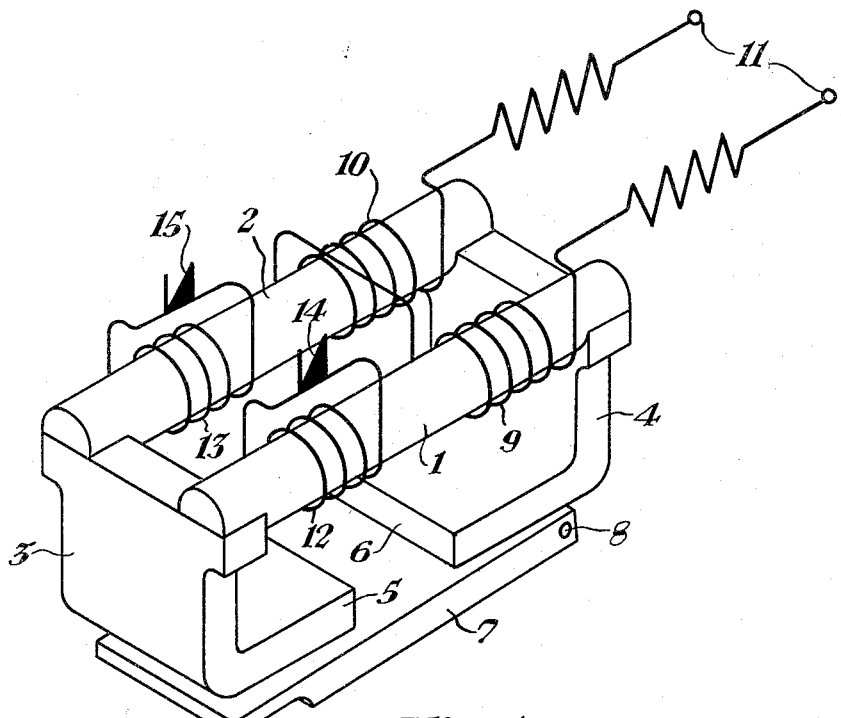
Figure 2:
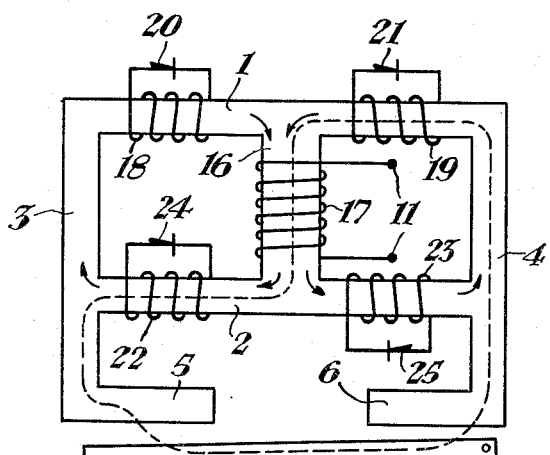

The invention is illustrated by way of example in the accompanying drawings Figure 1 of which is a diagrammatic isometric view of a relay embodying one form of the invention, Figure 2 being a diagrammatic view of another form.

Referring now to Figure 1, the relay therein shown comprises a core (which need not be laminated) consisting of a pair of parallel core members 1, 2 cross-connected at one end by a yoke 3 and at the other end by a yoke 4. The yokes 3 and 4 are extended to form pole members 5, 6 respectively and one end of an armature 7 is pivotally mounted at 8 on the yoke 4.

The core members 1, 2 are provided with energising windings 9, 10 respectively which are connected in series with one another to the terminals 11 of the relay, the windings 9, 10 being so arranged that the magneto-motive force due to current traversing these windings tends to cause magnetic flux to traverse the closed magnetic path including the core members 1, 2 and the yokes 3, 4 without causing any appreciable flux in the pole members 5, 6 and the armature 7.

The core members 1, 2 are also provided with auxiliary windings 12, 13 respectively, these windings being each short-circuited through a dry metal rectifier 14, 15 so as to form a closed circuit for one half-cycle of alternating current.

The rectifiers 14, 15 are so connected in the circuits of the auxiliary windings 12, 13 as to permit the flow of induced current therein in opposite directions so that during one half-cycle of alternating current supplied to the energising windings 9, 10 the current induced in the auxiliary winding 12 will traverse the rectifier 14 in the forward direction, the auxiliary winding 12 being thus substantially short-circuited under these conditions. The current similarly induced in the other auxiliary winding 13, will, however, be substantially zero since this current must traverse its rectifier 15 in the reverse direction. During the other or second half cycle of the alternating current supplied to the windings 9 and 10, the current induced in the auxiliary winding 13 will traverse the rectifier 15 in its forward direction and the winding 13 will be substantially short circuited but the current induced in the auxiliary winding 12 will be blocked by the rectifier 14.

The current induced in the substantially short-circuited winding 12 during the said one half cycle of the current supplied to the windings 9 and 10 will cause a magneto-motive force in the corresponding core member 1 opposing the flux due to the energising windings 9, 10 of the relay with the result that flux due to the energising winding 10 of the core member 2 will traverse the pole members 5, 6 and the armature 7 which is thus attracted. The auxiliary winding 13 of the other core member 2 is substantially inoperative during this said one half-cycle of the alternating current due to the rectifier 15 substantially blocking the flow of the current induced in the winding 13. Similarly, during the other half cycle of the alternating current the auxiliary winding 13 and its rectifier 15 are effective to produce a magnetomotive force in the corresponding core member 2 opposing the flux produced in the core member 2 by the energizing windings 9, 10 during the said other half cycle of the alternating current. This time the auxiliary winding 12 is ineffective because the rectifier 14 substantially blocks the flow of current induced in the winding 12. Thus during the said other half cycle of the alternating current a flux due to the energizing winding 9 of the core member 1 will traverse the pole members 5, 6 and the armature 7. The flux threading the pole members 5, 6 and the armature will be in the same direction during each half cycle of the alternating current due to the opposing magnetomotive force being created by winding 13 of core member 2 during one half cycle of the alternating current and the opposing magnetomotive force being created by the winding 12 of core 1 during the other half cycle. Furthermore, the delay action effected by the auxiliary windings 12, 13 and their respective short circuiting rectifiers 14, 15 will tend to cause the flux which traverses the pole members 5, 6 and the armature 7 to be maintained at a substantially constant value. It follows that when an alternating current is supplied to the relay a substantially constant unidirectional attractive force is applied to the relay armature 7 due to the core structure of the relay and the arrangement of its auxiliary windings short circuited by rectifiers.

It is clear that if a direct current is supplied to the energizing windings 9, 10 a steady direct flux will traverse the path through the core members 1, 2 and the cross connecting yokes 3 and 4. This direct flux will induce no magnetomotive force in the auxiliary windings 12, 13 with the result there will be no opposing magnetomotive force produced in the core members 1, 2 and substantially no flux will be made to thread the pole members 4, 5 and attract the armature 7. However, when an alternating current is supplied to the energizing windings 9, 10 and a corresponding alternating current is induced in each of the auxiliary windings 12, 13, the passing of the alternate half cycles of the current by the respective rectifiers 14, 15 causes opposing magnetomotive force, which in turn causes a portion of the flux created by the energizing windings 9 and 10 to traverse the poles 4 and 5 and the armature 7. This flux threading the pole members 5, 6 and the armature 7 is unidirectional due to the opposing magnetomotive force being created alternately in the core members 1 and 2. Also, the unidirectional flux is of a substantially constant value due to the delay action which is alternately effected by the auxiliary windings 12 and 13 and their respective short circuiting rectifiers 14 and 15.

In a modified arrangement the rectifiers for the core members instead of being connected across auxiliary windings 12, 13 may each be connected across the energising windings 9, 10 or a portion or extension thereof, so as to constitute an auto-transformer connection as compared with the two-coil transformer arrangement illustrated in Figure 1.

In a still further modification the energising windings 9, 10 may be connected in parallel with one another to the relay terminals 11, the circuit of each winding including a rectifier in series therewith. In this case the closed circuit including the energising windings 9, 10 and their rectifiers constitutes an auxiliary circuit for each of the core members 1, 2 alternately during the cycle and thereby causes an opposing magnetomotive force in this member so that the flux due to the energising winding of the other core member will traverse the pole members 5, 6 and the armature 7.

Referring now to Figure 2 in the relay therein shown, the core members 1, 2 in addition to being cross-connected at their ends by yokes 3, 4 are also centrally cross-connected by a core member 16.

The relay is in this case provided with a single energising winding 17 and the core member 1 is provided with two auxiliary windings 18, 19 one on each side of the central core member 16. The windings 18, 19 are each short-circuited through rectifiers 20, 21 and the core member 2 is similarly provided with auxiliary windings 22, 23 short-circuited by rectifiers 24, 25 respectively.

The magneto-motive force in the core member 16 due to alternating current supplied to the energising winding 17 will evidently tend to cause magnetic flux in one core path comprising the core members 16 and 3 and the left-hand portions of the core members 1 and 2 and in another parallel core path comprising the core members 16 and 4 and the right-hand portions of the core members 1 and 2, the directions in which the flux tends to flow in these core paths at a given instant being indicated by the arrows.

During one half-cycle of the alternating current supplied to the winding 17, however, the action of the auxiliary windings 18 and 23 and their associated rectifiers 20 and 25 will prevent any appreciable flux traversing the left-hand portion of the core member 1, the yoke 3 and the right-hand portion of core member 2. Under these conditions the path available for the flux will be as indicated by the dotted line, this path being traced from the lower end of the core 16, left-hand portion of core member 2, lower end of yoke 3, pole member 5, air gap, armature 7 from left to right, air gap, pole member 6, yoke 4, and the right-hand portion of core member 1 to the top end of the core 16. This flux is effective to attract the armature 7.

During the other half-cycle of the alternating current supplied to the winding 17, the action of the auxiliary windings 19 and 22, and their associated rectifiers 21 and 24 will prevent any appreciable flux traversing the right-hand portion of core member 1, yoke 4, and the left-hand portion of core member 2. This time the flux path can be traced from top end of core 16 through the left-hand portion of core member 1, yoke 3, pole member 5, air gap, armature 7 from left to right, air gap, pole member 6, lower portion of yoke 4, and the right-hand portion of core member 2 to the lower end of core 16. This flux also attracts the armature 7.

It will be understood that unidirectional current traversing the relay windings will cause flux to traverse the core and yoke members only without traversing the pole members, these being effectively magnetically shunted by the core members under these conditions. The relay of the invention is thus not responsive to uni-directional current as regards any tractive effect on the armature.

The constructional details of the relay evidently form no part of the invention which is accordingly not limited in this respect.

Having thus described my invention, what I claim is:

1. In an alternating current relay of the tractive armature type, a main magnetic circuit including a pair of parallel spaced magnetic core members and a pair of magnetic yokes one connected across each end of said core members, each said yoke having an extended pole member, said two pole members extending in the same direction from the plane of said core members, a rectangular armature having one end pivotally mounted adjacent one of said pole members and its other end attractively movable with respect to the other pole member, said two pole members and armature in series being an auxiliary magnetic circuit between said yokes, an exciting winding mounted for magnetic relationship with said main magnetic circuit to create a magnetic flux in the main magnetic circuit when supplied with current, said flux flowing in the main magnetic circuit exclusive to said auxiliary magnetic circuit due to the connection of said yokes between said core members, a pair of auxiliary windings one mounted on each of said core members, each said auxiliary winding inductively receiving an alternating electromotive force when alternating flux flows in the respective core member, a pair of half wave rectifiers one connected across each said auxiliary winding, each said auxiliary winding and connected rectifier in its forward direction being a low resistance circuit in which rectified current flows to create a unidirectional flux in the corresponding core member when an alternating electromotive force is induced in the auxiliary winding, said unidirectional flux opposing in the core member a given half cycle of the alternating flux flowing in the main magnetic circuit when alternating current is supplied to said exciting winding and forcing corresponding flux to thread said auxiliary magnetic circuit, and said rectifiers poled reverse to each other, whereby the armature is attracted only when alternating current is supplied to the exciting winding and the relay is immune to direct current and unidirectional flux flows in the pole members and armature in series and chattering is avoided.

2. In an alternating current relay of the tractive armature type, a main magnetic circuit including a pair of parallel spaced magnetic core members and a pair of magnetic yokes one connected across each end of said core members, each said yoke having an extended pole member, said two pole members extending in the same direction from the plane of said core members, a rectangular armature having one end pivotally mounted adjacent one of said pole members and its other end attractively movable with respect to the other pole member, said two pole members and armature in series being an auxiliary magnetic circuit between said yokes, a pair of exciting windings one mounted on each said core member, said windings connected to add their fluxes created in said core members when supplied with current, said flux flowing in said series magnetic circuit exclusive to said auxiliary magnetic circuit due to connection of said yokes between the core members, a pair of auxiliary windings one mounted on each said core member, each said auxiliary winding inductively receiving alternating electromotive forces when alternating flux flows in the respective core member, a pair of half wave rectifiers one connected across each said auxiliary winding, each auxiliary winding and the connected rectifier in its forward direction being a low resistance circuit in which rectified current flows to create a unidirectional flux in the core member on which the auxiliary winding is mounted when an alternating electromotive force is induced in the auxiliary winding, said unidirectional flux opposing in the corresponding core member a given half cycle of the alternating flux flowing in said series magnetic circuit to force a corresponding flux to thread said auxiliary magnetic circuit, and said rectifiers poled reverse to each other, whereby said armature is attracted only when alternating current is supplied to said exciting windings and the relay is immune to direct current and unidirectional flux threads the armature always from a given pole member to the other pole member in series and chattering is avoided.

3. In an alternating current relay of the tractive armature type, a main magnetic circuit including a pair of parallel spaced magnetic core members and a pair of magnetic yokes one connected across each end of said core members, each said yoke having an extended pole member, said two pole members extending in the same direction from the plane of said core members, a rectangular armature having one end pivotally mounted adjacent one of said pole members and its other end attractively movable with respect to the other pole member, said two pole members and armature in series being an auxiliary magnetic circuit between said yokes, a central magnetizable core member interposed in said series magnetic circuit by being cross connected between said pair of core members intermediate their ends, an exciting winding mounted on said central core member, a first and a second auxiliary winding mounted on a selected one of said pair of core members with the first winding on the right-hand side and the second winding on the left-hand side of said central core member, a third and a fourth auxiliary winding on the nonselected one of said pair of core members with the third winding on the right-hand side and the fourth winding on the left-hand side of said central core member, half wave rectifiers one connected across each of said auxiliary windings, the rectifiers for said first and fourth auxiliary windings poled to short circuit their respective windings for voltages induced therein during the positive half cycle of an alternating current supplied to said exciting winding, and the rectifiers of said second and third auxiliary windings poled to short circuit their respective windings for voltages induced therein during the negative half cycle of the alternating current supplied to the exciting winding.

KENNETH GORDON KING.

REFERENCES CITED

The following references are of record in the file of this patent:

UNITED STATES PATENTS

| Number | Name | Date |
|---|---|---|
| 512,386 | McBerty | Jan. 9, 1894 |
| 1,704,736 | Geiger | Mar. 12, 1929 |
| 1,742,367 | Nettleton | Jan. 7, 1930 |
| 2,046,748 | Hudson | July 7, 1936 |
| 2,276,675 | Scott | Mar. 17, 1942 |
| 2,416,681 | Dickten | Mar. 4, 1947 |
| 2,479,231 | Graybill | Aug. 16, 1949 |